United States Patent
Shulyak et al.

(10) Patent No.: US 11,385,896 B2
(45) Date of Patent: Jul. 12, 2022

(54) DETERMINING PREFETCH PATTERNS WITH DISCONTINUOUS STRIDES

(71) Applicant: Arm Limited, Cambridge (GB)

(72) Inventors: Alexander Cole Shulyak, Austin, TX (US); Joseph Michael Pusdesris, Austin, TX (US); Adrian Montero, Austin, TX (US); Balaji Vijayan, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/930,907

(22) Filed: May 13, 2020

(65) Prior Publication Data

US 2021/0357228 A1    Nov. 18, 2021

(51) Int. Cl.
*G06F 9/38*        (2018.01)
*G06F 9/345*        (2018.01)

(52) U.S. Cl.
CPC ............ *G06F 9/383* (2013.01); *G06F 9/3455* (2013.01)

(58) Field of Classification Search
CPC ..... G06F 9/383; G06F 9/3455; G06F 12/0862
See application file for complete search history.

(56) References Cited

U.S. PATENT DOCUMENTS

| | | | | |
|---|---|---|---|---|
| 6,076,151 A * | 6/2000 | Meier | ..................... | G06F 9/383 707/999.202 |
| 7,487,296 B1 * | 2/2009 | Iacobovici | .......... | G06F 12/0862 711/137 |
| 2009/0216956 A1 * | 8/2009 | Ekanadham | ........ | G06F 12/0862 711/137 |
| 2012/0131311 A1 * | 5/2012 | Chou | .................... | G06F 9/3806 712/207 |
| 2014/0359221 A1 * | 12/2014 | Kalamatianos | ..... | G06F 12/0811 711/122 |
| 2015/0121014 A1 * | 4/2015 | Dasika | ................ | G06F 12/0862 711/137 |
| 2015/0278100 A1 * | 10/2015 | Sundaram | ........... | G06F 12/0875 711/137 |
| 2016/0019065 A1 * | 1/2016 | Hayenga | ............... | G06F 9/3802 712/207 |
| 2016/0054997 A1 * | 2/2016 | Radhakrishnan | ..... | G06F 9/3455 711/137 |
| 2017/0010970 A1 * | 1/2017 | Chou | .................. | G06F 12/0862 |

* cited by examiner

*Primary Examiner* — Courtney P Carmichael-Moody
(74) *Attorney, Agent, or Firm* — Nixon & Vanderhye P.C.

(57) ABSTRACT

An apparatus and method are provided. The apparatus comprises storage circuitry to store a plurality of data elements. Processing circuitry executes a stream of instructions comprising access instructions that access some of the data elements at given locations. Training circuitry determines a pattern of the given locations based on the access instructions. Prefetch circuitry performs prefetches based on the pattern and filter circuitry filters the access instructions used by the training circuitry to determine the pattern by including discontinuous access instructions whose given location raises a discontinuity with the given location of a previous access instruction. In this way, it is possible to perform prefetching by calculating, rather than guessing, at a cumulative stride between the access instructions.

14 Claims, 20 Drawing Sheets

```
0      ?
32     ?
64  →  96  ✓
96  → 128  ✗
1   →  33  ✓
33  →  65  ✓
65  →  97  ✓
97  → 129  ✗
       ⋮
```

| PC Hash | Mode | Last VA | Cur Str | Confidence | Last UID |
|---|---|---|---|---|---|
| | Init | 0 | 0 | 0 | 0 |

500

| PC Hash | Mode | Last VA | Cur Str | Confidence |
|---|---|---|---|---|
| | Init | 0 | 0 | 0 |

510

| Uid | Address | Stride | Action |
|---|---|---|---|
| | | | |
| | | | |
| | | | |
| | | | |
| | | | |
| | | | |
| | | | |

520

| PF Address | Distance |
|---|---|
| | |
| | |
| | |
| | |
| | |
| | |
| | |

| PC Hash | Mode | Last VA | Cur Str | Confidence |
|---|---|---|---|---|
| | Init | 0 | 0 | 0 |

500

| PC Hash | Mode | Last VA | Cur Str | Confidence | Last UID |
|---|---|---|---|---|---|
| 0xcc | Init | 0 | 0 | 0 | 0 |

530

| PF Address | Distance |
|---|---|
| | |
| | |
| | |
| | |
| | |
| | |
| | |

520

| Uid | Address | Stride | Action |
|---|---|---|---|
| 0 | 0 | N/A | Alloc |
| | | | |
| | | | |
| | | | |
| | | | |
| | | | |
| | | | |

| PC Hash | Mode | Last VA | Cur Str | Confidence |
|---|---|---|---|---|
| | Init | 0 | 0 | 0 |

500

| PC Hash | Mode | Last VA | Cur Str | Confidence | Last UID |
|---|---|---|---|---|---|
| 0xcc | Setup | 1 | 1 | 0 | 1 |

520

| Uid | Address | Stride | Action |
|---|---|---|---|
| 0 | 0 | N/A | Alloc |
| 1 | 1 | 1 | Update, Hit |

530

| PF Address | Distance |
|---|---|
| | |

| PC Hash | Mode | Last VA | Cur Str | Confidence | Last UID |
|---|---|---|---|---|---|
| 0xcc | Stride | 2 | 1 | 7 | 2 |

510

| PC Hash | Mode | Last VA | Cur Str | Confidence |
|---|---|---|---|---|
|  | Init | 0 | 0 | 0 |

520

| Uid | Address | Stride | Action |
|---|---|---|---|
| 0 | 0 | N/A | Alloc |
| 1 | 1 | 1 | Update, Hit |
| 2 | 2 | 1 | Update, Hit |

530

| PF Address | Distance |
|---|---|
|  |  |
|  |  |
| 6 | 4 |
|  |  |
|  |  |
|  |  |
|  |  |
|  |  |

| PC Hash | Mode | Last VA | Cur Str | Confidence |
|---|---|---|---|---|
| 0xcc | Init | 32 | 0 | 0 |

500:

| PC Hash | Mode | Last VA | Cur Str | Confidence | Last UID |
|---|---|---|---|---|---|
| 0xcc | Stride | 32 | 1 | 6 | 3 |

520:

| Uid | Address | Stride | Action |
|---|---|---|---|
| 0 | 0 | N/A | Alloc |
| 1 | 1 | 1 | Update, Hit |
| 2 | 2 | 1 | Update, Hit |
| 3 | 32 | 30 | Update, MissWindow |

530:

| PF Address | Distance |
|---|---|
|  |  |
|  |  |
| 6 | 4 |
| 36 | 4 |
|  |  |
|  |  |
|  |  |
|  |  |

FIG. 5E

Table 500:

| PC Hash | Mode | Last VA | Cur Str | Confidence | Last UID |
|---|---|---|---|---|---|
| 0xcc | Stride | 33 | 1 | 7 | 4 |

Table 510:

| PC Hash | Mode | Last VA | Cur Str | Confidence |
|---|---|---|---|---|
| 0xcc | Init | 32 | 0 | 0 |

Table 520:

| Uid | Address | Stride | Action |
|---|---|---|---|
| 0 | 0 | N/A | Alloc |
| 1 | 1 | 1 | Update, Hit |
| 2 | 2 | 1 | Update, Hit |
| 3 | 32 | 30 | Update, MissWindow |
| 4 | 33 | 1 | Update, Hit |

Table 530:

| PF Address | Distance |
|---|---|
| 6 | 4 |
| 36 | 4 |
| 37 | 4 |

| PC Hash | Mode | Last VA | Cur Str | Confidence | Last UID |
|---|---|---|---|---|---|
| 0xcc | Stride | 34 | 1 | 7 | 5 |

510

| PC Hash | Mode | Last VA | Cur Str | Confidence |
|---|---|---|---|---|
| 0xcc | Init | 32 | 0 | 0 |

520

| Uid | Address | Stride | Action |
|---|---|---|---|
| 0 | 0 | N/A | Alloc |
| 1 | 1 | 1 | Update, Hit |
| 2 | 2 | 1 | Update, Hit |
| 3 | 32 | 30 | Update, MissWindow |
| 4 | 33 | 1 | Update, Hit |
| 5 | 34 | 1 | Update, Hit |

530

| PF Address | Distance |
|---|---|
|  |  |
|  |  |
| 6 | 4 |
| 36 | 4 |
| 37 | 4 |
| 38 | 4 |
|  |  |

| PC Hash | Mode | Last VA | Cur Str | Confidence |
|---------|------|---------|---------|------------|
| 0xcc | Setup | 64 | 32 | 0 |

500

| PC Hash | Mode | Last VA | Cur Str | Confidence | Last UID |
|---------|------|---------|---------|------------|----------|
| 0xcc | Stride | 64 | 1 | 6 | 6 |

520

| Uid | Address | Stride | Action |
|-----|---------|--------|--------|
| 0 | 0 | N/A | Alloc |
| 1 | 1 | 1 | Update, Hit |
| 2 | 2 | 1 | Update, Hit |
| 3 | 32 | 30 | Update, MissWindow |
| 4 | 33 | 1 | Update, Hit |
| 5 | 34 | 1 | Update, Hit |
| 6 | 64 | 30 | Update, MissWindow |

530

| PF Address | Distance |
|------------|----------|
|  |  |
|  |  |
| 6 | 4 |
| 36 | 4 |
| 37 | 4 |
| 38 | 4 |
| 68 | 4 |

| PC Hash | Mode | Last VA | Cur Str | Confidence | Last UID |
|---|---|---|---|---|---|
| 0xcc | Stride | 65 | 1 | 7 | 7 |

510

| PC Hash | Mode | Last VA | Cur Str | Confidence |
|---|---|---|---|---|
| 0xcc | Setup | 64 | 32 | 0 |

520

| Uid | Address | Stride | Action |
|---|---|---|---|
| 0 | 0 | N/A | Alloc |
| 1 | 1 | 1 | Update, Hit |
| 2 | 2 | 1 | Update, Hit |
| 3 | 32 | 30 | Update, MissWindow |
| 4 | 33 | 1 | Update, Hit |
| 5 | 34 | 1 | Update, Hit |
| 6 | 64 | 30 | Update, MissWindow |
| 7 | 65 | 1 | Update, Hit |

530

| PF Address | Distance |
|---|---|
| | |
| | |
| 6 | 4 |
| 36 | 4 |
| 37 | 4 |
| 38 | 4 |
| 68 | 4 |
| 69 | 4 |

| PC Hash | Mode | Last VA | Cur Str | Confidence | Last UID |
|---------|------|---------|---------|------------|----------|
| 0xcc | Stride | 66 | 1 | 7 | 8 |

510

| PC Hash | Mode | Last VA | Cur Str | Confidence |
|---------|------|---------|---------|------------|
| 0xcc | Setup | 64 | 32 | 0 |

520

| Uid | Address | Stride | Action |
|-----|---------|--------|--------|
| 8 | 66 | 1 | Update, Hit |
| 2 | 2 | 1 | Update, Hit |
| 3 | 32 | 30 | Update, MissWindow |
| 4 | 33 | 1 | Update, Hit |
| 5 | 34 | 1 | Update, Hit |
| 6 | 64 | 30 | Update, MissWindow |
| 7 | 65 | 1 | Update, Hit |

530

| PF Address | Distance |
|------------|----------|
| 70 | 4 |
| 6 | 4 |
| 36 | 4 |
| 37 | 4 |
| 38 | 4 |
| 68 | 4 |
| 69 | 4 |

| PC Hash | Mode | Last VA | Cur Str | Confidence | Last UID |
|---|---|---|---|---|---|
| 0xcc | Stride | 96 | 1 | 6 | 9 |

510

| PC Hash | Mode | Last VA | Cur Str | Confidence |
|---|---|---|---|---|
| 0xcc | Stride | 96 | 32 | 7 |

520

| Uid | Address | Stride | Action |
|---|---|---|---|
| 8 | 66 | 1 | Update, Hit |
| 9 | 96 | 30 | Update, MissWindow |
| 3 | 32 | 30 | Update, MissWindow |
| 4 | 33 | 1 | Update, Hit |
| 5 | 34 | 1 | Update, Hit |
| 6 | 64 | 30 | Update, MissWindow |
| 7 | 65 | 1 | Update, Hit |

530

| PF Address | Distance |
|---|---|
| 70 | 4 |
| 224 | 4 |
| 36 | 4 |
| 37 | 4 |
| 38 | 4 |
| 68 | 4 |
| 69 | 4 |

| PC Hash | Mode | Last VA | Cur Str | Confidence | Last UID |
|---|---|---|---|---|---|
| 0xcc | Stride | 97 | 1 | 7 | 10 |

510

| PC Hash | Mode | Last VA | Cur Str | Confidence |
|---|---|---|---|---|
| 0xcc | Stride | 96 | 32 | 7 |

520

| Uid | Address | Stride | Action |
|---|---|---|---|
| 8 | 66 | 1 | Update, Hit |
| 9 | 96 | 30 | Update, MissWindow |
| 10 | 97 | 1 | Update, Hit |
| 4 | 33 | 1 | Update, Hit |
| 5 | 34 | 1 | Update, Hit |
| 6 | 64 | 30 | Update, MissWindow |
| 7 | 65 | 1 | Update, Hit |

530

| PF Address | Distance |
|---|---|
| 70 | 4 |
| 224 | 4 |
| 225 | 4 |
| 37 | 4 |
| 38 | 4 |
| 68 | 4 |
| 69 | 4 |

| PC Hash | Mode | Last VA | Cur Str | Confidence | Last UID |
|---|---|---|---|---|---|
| 0xcc | Stride | 98 | 1 | 7 | 11 |

510

| PC Hash | Mode | Last VA | Cur Str | Confidence |
|---|---|---|---|---|
| 0xcc | Stride | 96 | 32 | 7 |

520

| Uid | Address | Stride | Action |
|---|---|---|---|
| 8 | 66 | 1 | Update, Hit |
| 9 | 96 | 30 | Update, MissWindow |
| 10 | 97 | 1 | Update, Hit |
| 11 | 98 | 1 | Update, Hit |
| 5 | 34 | 1 | Update, Hit |
| 6 | 64 | 30 | Update, MissWindow |
| 7 | 65 | 1 | Update, Hit |

530

| PF Address | Distance |
|---|---|
| 70 | 4 |
| 224 | 4 |
| 225 | 4 |
| 226 | 4 |
| 38 | 4 |
| 68 | 4 |
| 69 | 4 |

| PC Hash | Mode | Last VA | Cur Str | Confidence |
|---|---|---|---|---|
| 0xcc | Stride | 128 | 32 | 7 |

530

| PF Address | Distance |
|---|---|
| 70 | 4 |
| 224 | 4 |
| 225 | 4 |
| 226 | 4 |
| 256 | 4 |
| | |
| 68 | 4 |
| 69 | 4 |

500

| PC Hash | Mode | Last VA | Cur Str | Confidence | Last UID |
|---|---|---|---|---|---|
| 0xcc | Stride | 128 | 1 | 6 | 12 |

520

| Uid | Address | Stride | Action |
|---|---|---|---|
| 8 | 66 | 1 | Update, Hit |
| 9 | 96 | 30 | Update, MissWindow |
| 10 | 97 | 1 | Update, Hit |
| 11 | 98 | 1 | Update, Hit |
| 12 | 128 | 30 | Update, MissWindow |
| | | | |
| 6 | 64 | 30 | Update, MissWindow |
| 7 | 65 | 1 | Update, Hit |

DETERMINING PREFETCH PATTERNS WITH DISCONTINUOUS STRIDES

TECHNICAL FIELD

The present disclosure relates to data processing. For instance, the present disclosure could have relevance to memory systems.

DESCRIPTION

Prefetching is a technique whereby data, whose use is predicted in the near future, is fetched from memory and stored, for instance, in a cache before being explicitly requested. As a consequence of this technique, when the data is explicitly requested, the latency associated with acquiring the data is reduced. This process requires calculating a relationship between explicit memory accesses so that later predictions can be made. However, such predictions are difficult to make in the presence of particular data structures (an array of arrays for instance). This can lead to inefficiencies when requested data has not been prefetched.

SUMMARY

Viewed from a first example configuration, there is provided an apparatus comprising: processing circuitry to execute a stream of instructions comprising access instructions that access at least some data elements at given locations of a storage circuitry; training circuitry to determine a pattern of the given locations based on the access instructions; prefetch circuitry to perform prefetches based on the pattern; and filter circuitry to filter the access instructions used by the training circuitry to determine the pattern by including discontinuous access instructions, wherein the given location of each of the discontinuous access instructions raises a discontinuity with the given location of a preceding access instruction of that discontinuous access instruction.

Viewed from a second example configuration, there is provided a data processing method comprising: executing a stream of instructions comprising access instructions that access at least some stored data elements at given locations; determining a pattern of the given locations based on the access instructions; performing prefetches based on the pattern; and filtering the access instructions used by the training circuitry to determine the pattern by including discontinuous access instructions, wherein the given location of each of the discontinuous access instructions raises a discontinuity with the given location of a preceding access instruction of that discontinuous access instruction.

Viewed from a third example configuration, there is provided an apparatus comprising: means for executing a stream of instructions comprising access instructions that access at least some stored data elements at given locations; means for determining a pattern of the given locations based on the access instructions; means for performing prefetches based on the pattern; and means for filtering the access instructions used by the means for determining the pattern by including discontinuous access instructions, wherein the given location of each of the discontinuous access instructions raises a discontinuity with the given location of a preceding access instruction of that discontinuous access instruction.

BRIEF DESCRIPTION OF THE DRAWINGS

The present invention will be described further, by way of example only, with reference to embodiments thereof as illustrated in the accompanying drawings, in which:

FIGS. 5A to 5N illustrate a process of using a series of storage structures that can be used in order to detect the presence of discontinuous access requests;

DESCRIPTION OF EXAMPLE EMBODIMENTS

Figure 1:
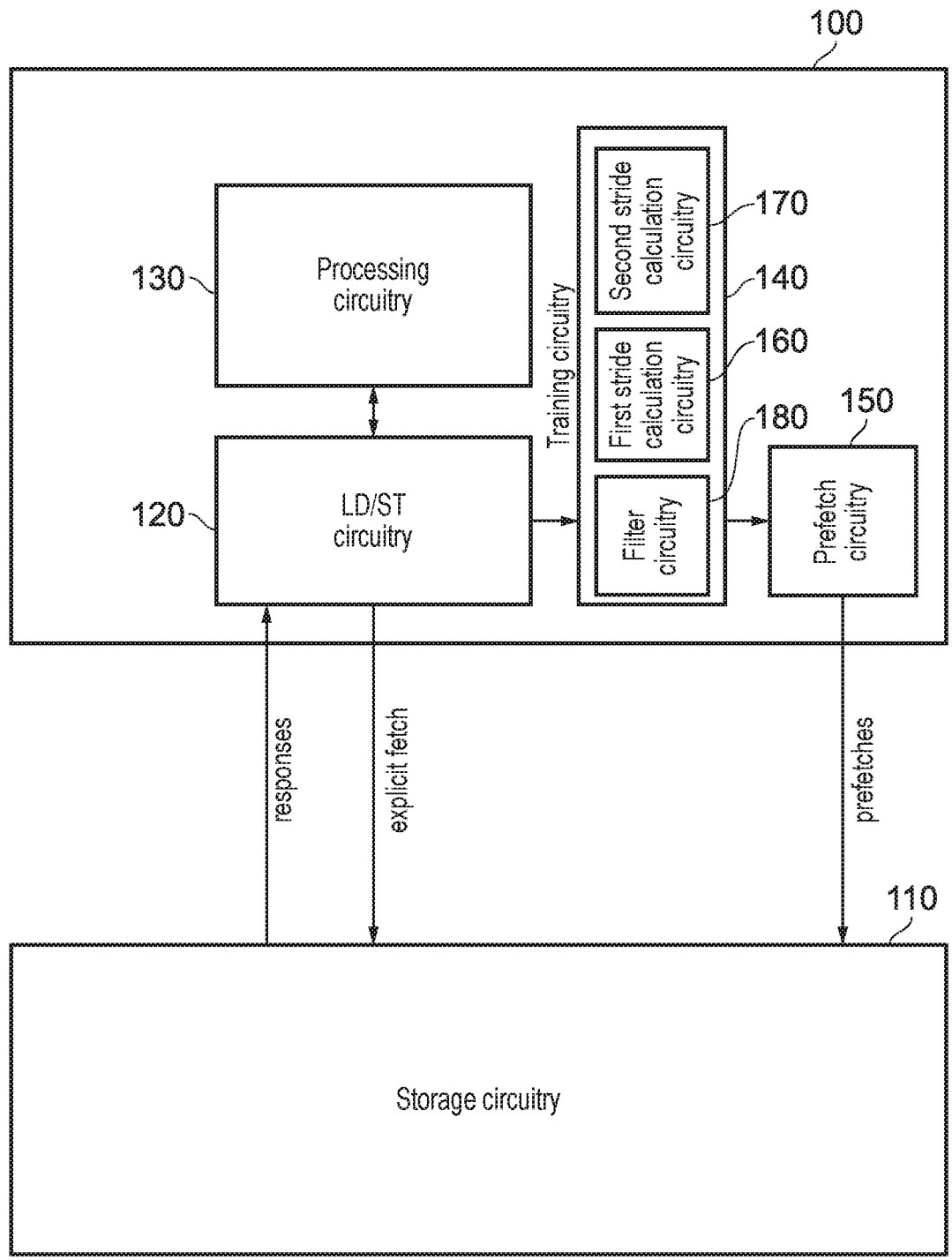
FIG. 1 illustrates an apparatus in accordance with some embodiments.

Before discussing the embodiments with reference to the accompanying figures, the following description of embodiments is provided.

In accordance with one example configuration there is provided there is provided an apparatus comprising: processing circuitry to execute a stream of instructions comprising access instructions that access at least some data elements at given locations of a storage circuitry; training circuitry to determine a pattern of the given locations based on the access instructions; prefetch circuitry to perform prefetches based on the pattern; and filter circuitry to filter the access instructions used by the training circuitry to determine the pattern by including discontinuous access instructions, wherein the given location of each of the discontinuous access instructions raises a discontinuity with the given location of a preceding access instruction of that discontinuous access instruction.

In these examples, the processing circuitry (which could take the form of a load/store unit, or a CPU for instance) issues explicit access instructions to access data elements in the storage circuitry (e.g. a DRAM). Training circuitry analyses the locations of the requested elements in the storage circuitry in order to determine a pattern between the locations. Prefetch circuitry then performs prefetches using the pattern based on later explicit requests. For instance, if it is determined that the memory accesses being made are 64 bytes apart then when an explicit request is made for data at a memory location M is made, the prefetcher will automatically fetch the data at byte M+64 since the prefetcher is predicting that this data will soon be requested. In these examples, filter circuitry is provided, which filters which of the explicit access instructions is used to determine the pattern. In particular, the filter causes those of the access instructions that are discontinuous to be used for establishing the pattern. Other access instructions are not used by this prefetch circuitry (although could be used by other prefetch circuitry). Discontinuous access instructions have a discontinuity between their given location (the location in the storage circuitry that is accessed by the instruction) and the given location of an instruction that precedes (e g immediately precedes in program order) the discontinuous access instruction. In this way, it is possible to consider a pattern from the discontinuous access instructions themselves and therefore establish a manner of prefetching that takes these discontinuities into account.

In some examples, the plurality of elements is stored within a plurality of independent data structures. Discontinuity in the given locations of access instructions can occur as a consequence of accessing independent data structures. For instance, if a sequence of instructions seeks to iterate through each element of each data structure, then a plurality of access patterns may exist in the form of a first pattern between the individual elements of a single data structure and a second pattern between the data structures themselves.

In some examples, the independent data structures are evenly spaced in the storage circuitry. In these examples, there may be a common spacing between each of the data structures. That is to say that each of the independent data structures, in some embodiments, occupies the same amount of space in the storage circuitry. This makes it possible to detect a common pattern between accesses made to the start of each of the independent data structures.

In some examples, the independent data structures are arrays. In particular, the data elements that are accessed by the access instructions could be arranged as an array of arrays. Such data structures can be used in order to implement a 2D data structure having both columns and rows. In these examples, the determination of an access pattern is possible regardless of whether the access occurs by iterating through each column of each row or each row of each column.

In some examples, the access instructions are adapted to access the data elements in an order that iterates between each of the data structures. In particular, in some examples, a first element of each of the data structures is accessed before accessing a second element of each of the data structures, and so on. Such an access pattern can result in large changes in access address. When the accesses become directed to the second element of the first data structure (from the last element of the first data structure), this can result in a large decrease in access address, particularly if the data structures are organised in memory as individual contiguous blocks of memory.

In some examples, the training circuitry comprises stride calculation circuitry to calculate a stride length based on the access instructions; and the prefetch circuitry is adapted, in response to one of the data elements being explicitly requested from an address of the storage circuitry, to fetch another one of the data elements at a corresponding address, which is formed by adding the address to a multiple of the stride length. The stride calculation circuitry is used to calculate the stride length by analysing a plurality of corresponding access instructions. The access instructions could correspond, for instance, by sharing a program counter value. This could occur in a loop, for instance, where the same instruction is executed multiple times for different addresses, resulting in multiple corresponding accesses being made for multiple locations. The stride length could be defined as the distance between two such adjacent access instructions. If this access pattern is demonstrated over a number of accesses, then a multiple of the stride length can be used in order to fetch future data elements. For instance, if the stride length is calculated as 64 bytes, then a later corresponding access instruction made to a memory address M could result in the prefetching of data stored at an address M+64. In practice, a multiple of the stride length may be used. For instance, the access of an address M could result in prefetching data stored at an address M+(64×8) where '8' is the multiple of the stride '64'. This is because the time required to access data from memory might be so time consuming that prefetching only a single address in advance could result in the prefetched data arriving long after it is explicitly requested. Of course, the stride multiple must also be balanced against the fact that if the data is requested too far in advance then it could remain unused for a sufficiently long period of time that it is evicted In some examples, the plurality of elements are stored within a plurality of independent data structures; and the discontinuous access instructions are adapted to access at least some boundaries of the independent data structures. In these examples, the boundaries of the independent data structures (e.g. those entries of the independent data structures that are at the beginning or end of the independent data structure) are the entries that cause discontinuous access instructions to be issued. In particular, these are the entries of the independent data structures that are more likely to cause a change in access pattern as compared to access instructions that reference elements within the data structures.

In some examples, the discontinuous access instructions are adapted to access first elements of the independent data structures. As explained above, one example of an element on a boundary of the independent data structure is the first element of the independent data structure. Since the independent data structures are likely to be spaced at intervals that are significantly different from the intervals between the elements of each independent data structure, a new access to the first element of an independent data structure is more likely to be discontinuous as compared to the preceding accesses.

In some examples, the training circuitry comprises first stride calculation circuitry to calculate a first stride length based on the access instructions other than the discontinuous access instructions; the training circuitry comprises second stride calculation circuitry to calculate a second stride length based on the discontinuous access instructions; and the pattern is equal to the second stride length. As previously explained, the training circuitry may handle the discontinuous access instructions separately from the remaining (continuous) access instructions. In these examples, first stride calculation circuitry is responsible for determining stride length based on the continuous access instructions while second stride calculation circuitry is used to calculate a second stride length using the discontinuous access instructions. In these examples, when discontinuous access requests occur, the second stride length is calculated and it is this second stride length that is used as the pattern for performing prefetches. On other occasions, such as parts of the program for which no discontinuous access requests occur, no second stride length is calculated and so prefetches occur using the first stride length that is calculated for the continuous access instructions in that part of the program.

In some examples, the second stride length is equal to an accumulation of each stride length between each of the access instructions from a first discontinuous access instruction to a next discontinuous access instruction. These examples calculate the second stride length as an accumulation of the stride length that occur for each access instruction between a first discontinuous access instruction and a next discontinuous access instruction. In a situation in which a plurality of data structures is provided (e.g. a plurality of arrays), where each of the data structures is stored contiguously and where iteration occurs between each element of each of the data structures, the second stride length is equal to the sum of all of the accesses made within a data structure. For instance, if each data structure contains ten elements of one byte each, and each element of each data structure is accessed, then the second stride length can be calculated as being 10×1, which corresponds with the size of each of the data structures. Calculating the second stride length in this manner means that the apparatus need not know the size of the data structures and can calculate this information instead. This is particularly useful since the size of the data structures is generally not visible from the instructions themselves.

In some examples, the discontinuous access requests are detected by a miss in the first stride calculation circuitry; and in response to the miss, the second stride calculation circuitry is updated. There are a number of ways of detecting discontinuous access requests. However in some examples the presence of a miss in the first stride calculation circuitry (which considers continuous access requests) can be indicative that a discontinuous access request has occurred. In this context, a miss occurs where there is an entry for the current instruction, but the stride value listed with that entry does not correspond with the stride that is calculated for the current access instruction. The presence of such a miss therefore indicates that any previously detected (continuous) pattern does not apply. Consequently, in such situations, the discontinuous access request can be passed to the second stride calculation circuitry for consideration.

In some examples, the access instructions are issued to the processing circuitry out of order as compared to a program order; the first stride value defines a first stride window; and the miss falls outside the first stride window. Out-of-order execution is a technique in which the instructions, which begin in program order, can be reordered in order to take advantage of circuitry that is otherwise unused. For instance, if the program order dictates that a series of addition instructions is followed by an unrelated memory access instruction, then if the memory unit is otherwise unoccupied, there is no need to wait for the series of addition instructions to be executed before the memory access instruction is executed. Out-of-order execution could therefore permit the memory access permission to be issued while an arithmetic execution unit takes care of the addition instructions. Of course, such reordering must respect the ordering of instructions that might affect the outcome of execution. In these examples, it is possible that memory access instructions are performed out-of-order. This can make the detection of strides more difficult. These examples define a first stride window, which is a range surrounding the calculated stride value. When a miss occurs in respect of the stride value stored for a given instruction, the calculated stride must be sufficiently far from the stored stride value (e.g. outside the stride window) in order to be treated as a discontinuous access instruction by the second stride calculation circuitry. This helps to avoid a situation in which a continuous access request from an iteration n+x is issued when an access request for an iteration n+1 is expected (x>1).

In some examples, the access instructions are issued to the processing circuitry out of order as compared to a program order; the training circuitry is adapted to track a youngest access instruction to have updated the training circuitry; and the training circuitry is adapted to disregard an older access instruction than the youngest access instruction. A further improvement that can be made in order to avoid out-of-order execution disrupting stride calculation is to track the youngest access instruction to have updated the training circuitry. Then, any access instructions that are received that are older than the tracked access instruction are not considered for the purposes of training. This helps to avoid the elimination of strides or the formulation of potential strides that are incorrect but are revealed as a consequence of out-of-order execution.

In some examples, the access instructions are stored at a same program counter value. As previously described, the access instructions of interest may be stored at a same program counter value as each other. That is, training and prefetching can occur in respect of accesses made for the same program counter value, with each program counter value being separately trained and used for prefetching.

In some examples, the given location raises the discontinuity with the given location of the previous access instruction by having a discontinuous stride. The discontinuity could be raised in the sense that the stride between a discontinuous access instruction and preceding access instruction differs from the stride between a previous access instruction and a further previous access instruction. For instance, if a first access instruction accesses an address L, and a second access instruction accesses an address L+5, followed by a next access instruction that accesses an address L+10, and a further access instruction accesses an address L+50, then this represents a discontinuous stride since the change in access location significantly differs from what was previously established. For instance, a previous stride of 5 had been established via the sequence L, L+5, L+10 whereas the final (discontinuous) access instruction represents a stride of 40 ((L+50)−(L+10)), which is therefore discontinuous.

Particular embodiments will now be described with reference to the figures.

FIG. 1 illustrates an apparatus 100 in accordance with some embodiments. The apparatus 100 could take the form of a CPU for instance and includes processing circuitry 130, which is responsible for issuing and/or executing a number of instructions. Some of these instructions include access instructions, which are responsible for accessing data stored in a storage circuit 110 such as a DRAM. The access instructions are issued to load/store circuitry 120, which issues the access instructions in the form of an explicit fetch request to storage circuitry 110. In addition, during periods of low bandwidth between the apparatus 100 and storage circuitry 110, prefetch circuitry 150 may be used to prefetch data from the storage circuitry 110 before it is explicitly requested via the processing circuitry 130. Data that is prefetched in this manner may ultimately be provided to the apparatus 100 when it is explicitly requested by the processing circuitry 130. However, the data could actually arrive via a cache, for instance, into which prefetched data is stored. Training circuitry 140 is provided in order to train the prefetch circuitry 150 to determine which data is most likely to be required in the near future. The training circuitry 140 bases its analysis on the sequence of explicit access requests that are issued from the processing circuitry 130. In these examples, filter circuitry 180 is provided to influence how the access requests are used by the training circuitry 140. For instance, FIG. 1 illustrates first stride calculation circuitry 160, which is responsible for determining a pattern of access requests that meet a first criterion, while second stride calculation circuitry 170 is used to determine an access pattern of the remaining access requests (those that do not meet the criterion). In particular, each of the two stride calculation circuits 160, 170 considers a stride length between explicit access instructions that are adjacent to each other in program order. The stride could be considered to be the difference in memory addresses accessed by those explicit access instructions. For instance, considering the situation of a loop, if an instruction at an address A causes a memory access to be made at an address M, and at a next iteration of the loop the same instruction at address A causes an access at an address L, then the stride for the instruction at address A can be considered to be equal to (L−M). Consequently, when a later access is made by instruction A to address Q, the prefetcher 150 can cause the prefetch of data at address Q+(L−M). In practice, a multiple of the stride length is fetched so that data as an address Q+k(L−M) is prefetch, where k is the multiple. This represents the fact that enough time must be provided between the prefetch occurring and the expected data request being made so that the prefetch data will be available at the time it is explicitly requested. The value of k may be dependent on the time taken between iterations of instruction A being executed and the speed at which data arrives from the storage circuitry 110.

Note that the access instructions that are issued by processing circuitry 130 need not be in program order. In particular, the processing circuitry 130 could make use of issue circuitry that causes instructions to be issued out-of-order to the load/store circuitry 120. As a consequence of this, for instance, the instruction A could be issued for a later iteration before having been issued for an earlier iteration. That is, for instance, the instruction A may be issued for a fifth iteration before it has been issued for a third iteration. Such reordering could occur, for instance, if it is considered by the processing circuitry 130 to be more procedurally efficient (in view of other instructions to be executed) for such reordering to occur. The reordering takes account of dependencies between the data required for each of the instructions. The full process by which this occurs is not the subject of the present disclosure and will be known to the skilled person.

The exact location of particular elements is, of course, configurable. For instance, the filter circuitry 180 could form part of the load/store circuitry 120 or could sit between the load/store circuitry 180 and the training circuitry 140.

Figures 2A, 2B:
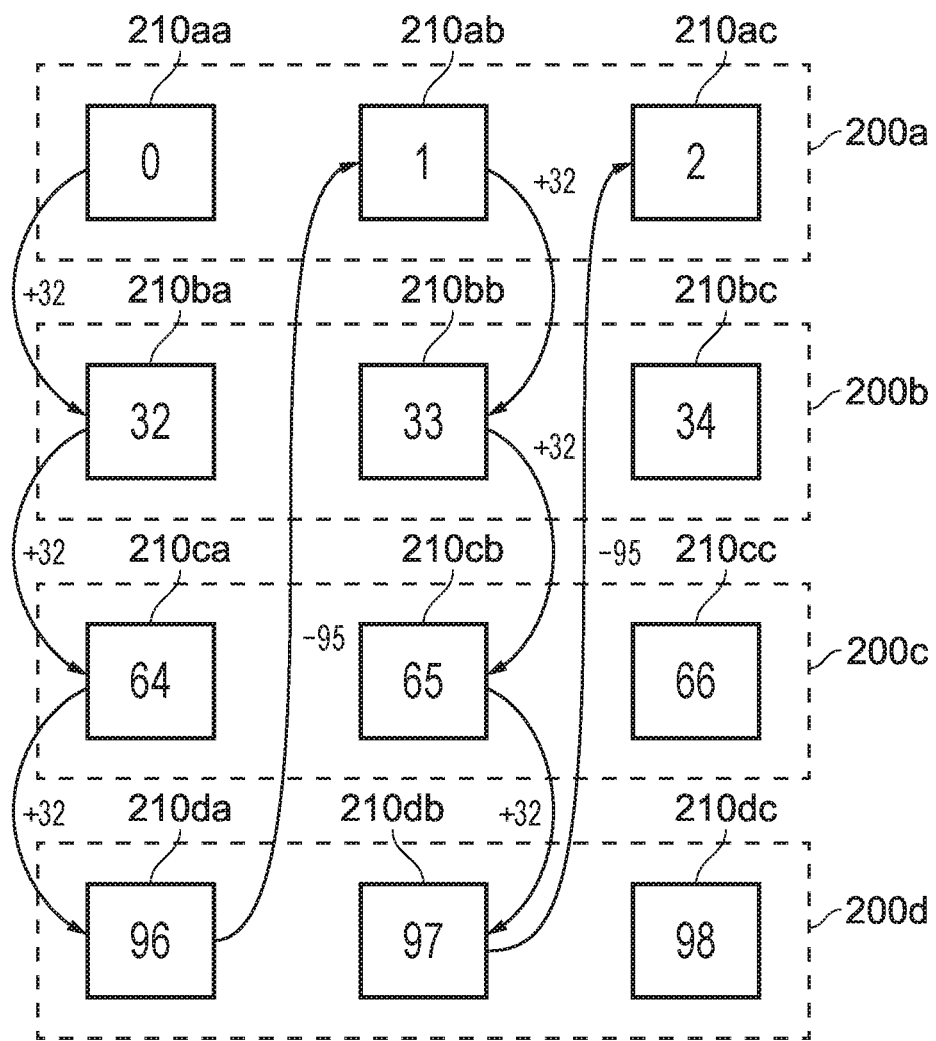
FIG. 2A illustrates the organisation of data elements within the storage circuitry.
FIG. 2B illustrates a result of using naive prefetching in respect of the data access pattern shown in FIG. 2A.

FIG. 2A illustrates an organisation of data elements 210aa, 210ab, 210ac, 210ba, 210bb, 210bc, 210ca, 210cb, 210cc, 10da, 210db, 210dc within the storage circuitry 110. The data elements are organised into data structures 200a, 200b, 200c, 200d. In this example, a first data structure 200a contains three data elements 210aa, 210ab, 210ac. A second data structure 200b contains data elements 210ba, 210bb, 210bc. A third data structure 200c contains data elements 210ca, 210cb, 210cc. A fourth data structure 200d contains data elements 210da, 210db, 210dc. The data structures 200a, 200b, 200c, 200d could, for instance, take the form of arrays with the set of data structures 200a, 200b, 200c, 200d collectively forming an array of arrays that implement a 2D data structure. FIG. 2A illustrates the address of each of the data elements. In particular, each data element of a single data structure 200a, 200b, 200c, 200d is separated by a distance of 1. In contrast, each of the data structures themselves 200a, 200b, 200c, 200d is separated by a distance of 32. Accordingly, if the access pattern for each data element of each data structure proceeds by iterating primarily between the data structures 200a, 200b, 200c, 200d, as illustrated in FIG. 2A, then the accesses will occur at an address 0, followed by 32, 64, and 96, before returning to 1. This will then be followed by addresses 33, 65, 97, 2, 34, 66, 98, and so on.

FIG. 2B illustrates a result of using naive prefetching for the access pattern shown in FIG. 2A. In particular, in this example, it is assumed that the multiple of the stride length that is used for prefetching is equal to 1. The first accesses are made to addresses 0 and 32. These result in no prefetching being performed because during these accesses, the training circuitry 140 has no knowledge of the stride length. Instead, the training circuitry 140 uses these accesses to determine the stride length (32−0=32). Consequently, when the next access is made to address location 64, the data at address location 96 (64+1×32) is prefetched. As illustrated in FIG. 2A, this behaviour would be appropriate, since 96 is the next address to be accessed. However, when the access is made to address 96, this would lead to the prefetching of data at an address location 128 (96+1×32), which is incorrect. In particular, the next address to actually be accessed is address 1. This would therefore require the data at location 1 to be fetched from memory. The next accesses would continue correctly. In particular, the access to address 1 would then cause the correct prefetching of address 33 (1+1×32), the access of address 33 would result in the correct prefetching of address 65 (33+1×32), and the access of address 65 would result in the correct prefetching of address 97 (65+1×32). However, once again, the accessing of address 97 would result in the prefetching of an address 129 (97+1×32), which is incorrect. The next access to actually occur would be to address 2.

It can be seen that in this particular data structure, the access pattern causes incorrect prefetching to occur.

Figures 3A, 3B:
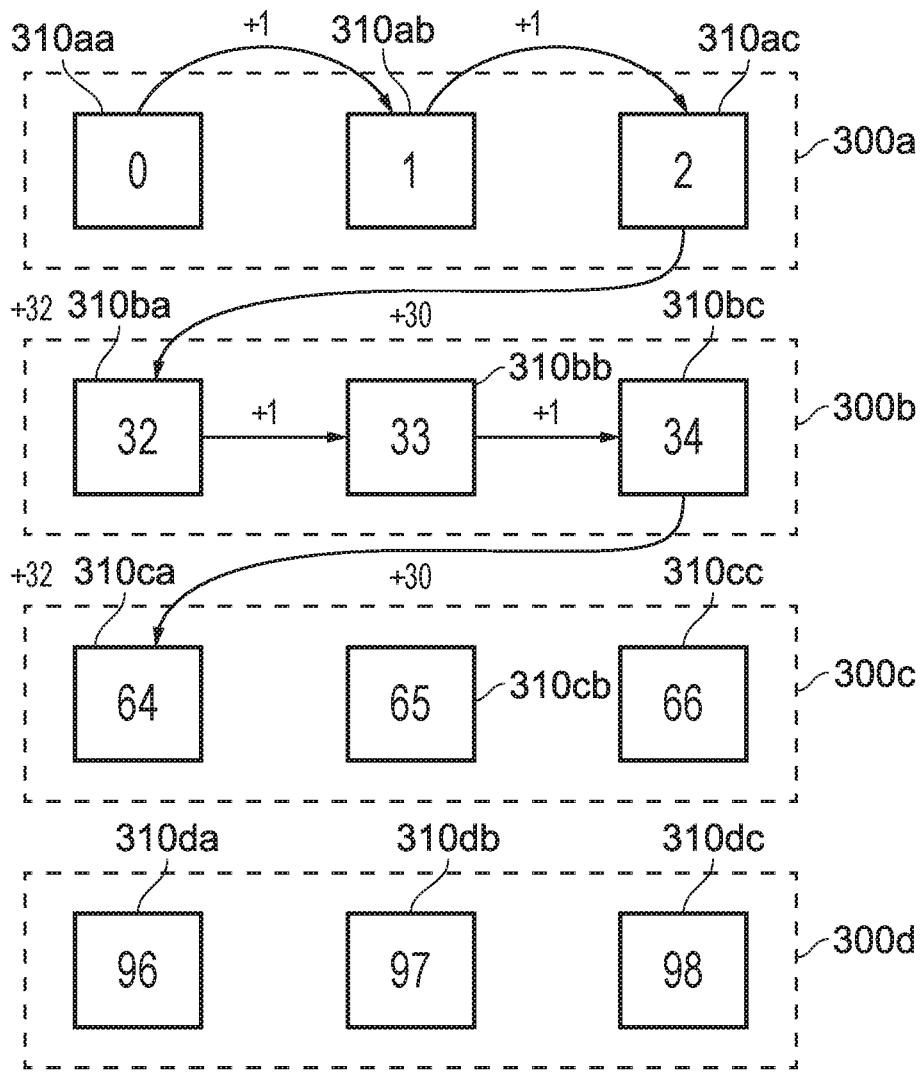
FIG. 3A illustrates an example in which the access pattern does not iterate between the data structures at each access.
FIG. 3B illustrates the effect of applying naive prefetching in respect of the data access pattern shown in FIG. 3A.

FIG. 3A illustrates a similar example in which the access pattern does not iterate between the data structures 300a, 300b, 300c, 300d at each access. Once again, the first data structure 300a contains three data elements 310aa, 310ab, 310ac. The second data structure 300b contains three data elements 310ba, 310bb, 310bc. The third data structure 300c contains three data elements 310ca, 310cb, 310cc. The fourth data structure 300d contains three data elements 310da, 310db, 310dc. Here, the access pattern increases by 1 for each data element within the data structure, followed by an increase of 30, when the next data structure is accessed.

FIG. 3B illustrates the effect of applying naive prefetching in respect of the data access pattern shown in FIG. 3A. In particular, during accesses to an address 0 and address 1, no prefetching is possible. After this point, it may be concluded that the calculated stride length is 1. However, the access to address 2 would cause prefetching to occur at address 3 (2+1×1), which is incorrect. Thereafter, accesses to addresses 32 and 33 would result in prefetching of addresses 33 (32+1×1) and 34 (33+1×1), which are correct. However, the access to address 34 would result in the prefetching of address 35 (34+1×1), which is incorrect. Similarly, prefetching would correctly occur for addresses and 64 and 65, which cause the prefetch of addresses 65 (64+1×1) and 66 (65+1×1). However, the access of address 66 would incorrectly cause the prefetch of address 67 (66+1×1) rather than the address 96, which is actually accessed.

The situation illustrated in FIGS. 2A, 2B, 3A, and 3B what is referred to as a "cumulative stride". In particular, the access pattern comprises multiple different strides, which must be added together in order to correctly determine the data to be prefetched. It will be appreciated that the prefetches that fail occur at boundaries of the data structures. For instance, in the example of FIG. 2A, once the ends of the data structures have been reached (e.g. at by accesses at addresses 96, 97, and 98), the prefetches that occur as a result of those accesses are incorrect. Similarly, in respect of FIG. 3A, the boundaries that cause failure are at the end of each of the data structures. That is, prefetching fails for the data elements at the end of each data structure, such as those at addresses 2, 34, 66, and 98. The reason for the failure in each of these cases is that this is the point at which the access pattern changes as compared to the access pattern that has been used up until that point. For example, in the case of FIG. 3A, the access pattern was +1, whereas at the boundary, the access pattern becomes +30. Thereafter, the access pattern returns to +1, but again becomes +30 at the boundary between the second data structure 300b, and the third data structure 300c.

Figure 4:
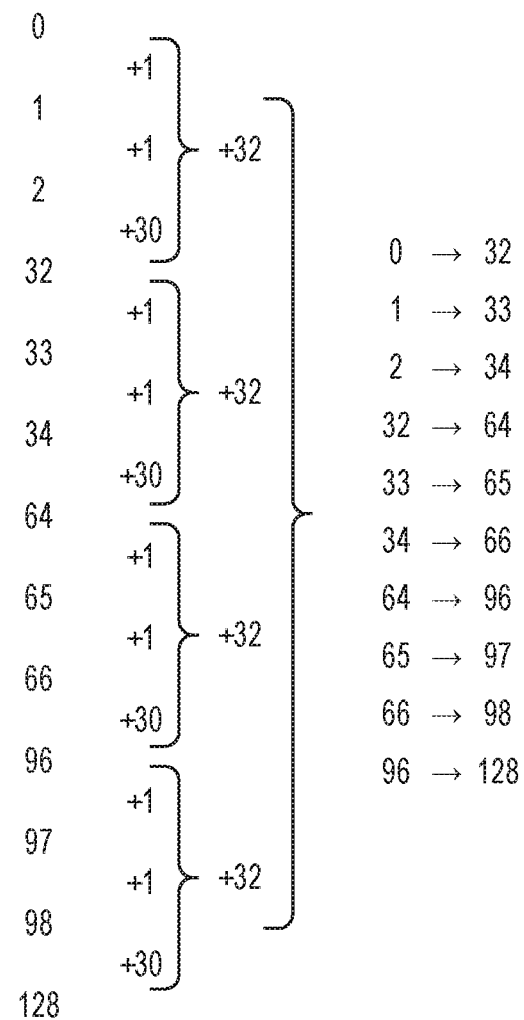
FIG. 4 illustrates how the recognition of cumulative stride can be used in order to correctly perform prefetching while iterating through each of the data structures.

FIG. 4 illustrates how the recognition of a cumulative stride can be used in order to correctly perform prefetching while iterating through each of the data structures. In particular, taking the example of FIG. 3A, it will be appreciated that a pair of +1 strides occur, followed by a +30 stride. This pattern then repeats. The total stride that repeats is therefore equal to +32 (1+1+30). If this pattern can be detected, then prefetching can be successfully performed for each of the data elements of each of the data structures. In particular, as shown in FIG. 4, an access to an address 0 could cause the prefetching of address 32 (0+32), access of address 1 could cause the prefetching of address 33 (1+32), access to address 2 could cause the prefetching of address 34 (2+32), access of address 32 could cause the access of address 64 (32+32), access of address 33 could cause the access of address 65 (33+32), and so on. In the present technique, the training circuitry 140 utilises second stride calculation circuitry 170 in order to calculate a second stride length based on access instructions that are discontinuous. In this example, the discontinuous access instructions are those for which a prefetch miss occurs in FIGS. 2B and 3B. As previously explained, such access instructions can occur at boundaries of the data structures. Such access instructions also correspond with changes in stride length as compared to the stride length that has previously been used. For instance, in the case of FIG. 2A, the stride length suddenly changes from +32 to −95 at the boundary where a discontinuous access request occurs. Similarly, in the case of FIG. 3A, the stride length changes from +1 to +30. By detecting these discontinuous access requests it is possible to consider all the stride lengths that occur during the access process, thereby determining the cumulative stride length. This information can then be used in order to inform the prefetcher behaviour.

FIGS. 5A to 5N illustrate a series of storage structures that can be used in order to detect the presence of discontinuous access requests and to use this information in order to perform prefetching. Table 500 is used in order to determine a first stride length from continuous access instructions and can therefore be used by the first stride calculation circuitry 160, as previously described. Table 510 is used for calculating a second stride length and can therefore be used by second stride calculation circuitry 170 as previously described. Table 520 illustrates a sequence of accesses that occur from multiple iterations of an instruction at a particular program address, and the action that is taken. Table 530 illustrates the prefetches that are performed. Changes to values in the tables are illustrated in bold.

In FIG. 5B, a first access to an address 0 is issued. In this example, the UID (unique identifier), which could be likened to a loop iteration number, is 0. In this situation, there is no stride since because there has only been a single access. Furthermore, the action that is taken is to perform an allocation to the first table 500. This is because no current entry exists in the first table 500 for the access instruction. The entry that is made into the first table 500 includes a hash (0xcc) of the program counter value of the instruction in question. The mode of this entry is set to 'init', which is the initial value for a new entry of the table 500. "Last VA¦ is the last virtual address (0) that was accessed for this instruction. "Current Str" (current stride) is the stride that has been detected (0). "Confidence" represents how confident the detected stride value is and "Last UID" is the last unique identifier encountered for this access instruction (0).

In FIG. 5C, the instruction executes with a UID of 1 in order to access address 1. Here, the stride can now be calculated as 1 (1−0) by referencing the @Last VA" for this entry in the first table 500. The action that occurs is a hit, since an existing entry exists in the first table 500 at the same program counter hash value and also an update of the first table. In particular, the init mode becomes a setup mode, indicating that a stride value is being set up. The last VA is set to the last address to be accessed (which is now 1), the current stride is set to 1, since this is the working hypothesis for the current stride value. Similarly, the last UID is updated to 1, since that is the most recent UID related to this program counter hash value.

In FIG. 5D, a further instruction occurs with a UID of 2. This access occurs to address 2. This has a stride value of 1 (2−1), which corresponds with the previously calculated stride value. Once again, a hit occurs in the first table 500, and the first table 500 is updated to represent the fact that a stride has now been confirmed (the mode is set to 'stride'), the last VA is updated to 2, the current stride is maintained as 1, and the last UID is updated to 2. In this example, the confidence is set to 7, which is the default value for a newly determined stride value. As a consequence of determining this stride, prefetching now begins. In particular, this access causes a corresponding prefetch to occur as illustrated in the prefetch table 530. Here, the prefetch multiple is 4 meaning that a prefetch occurs at an address 2+(1×4). Here, 2 is the address that has been explicitly accessed, a stride length of 1 is used, and a multiple of 4 is used.

FIG. 5E illustrates the first discontinuous access request. The UID of the access is 3, and address 32 is accessed. Here, the stride is now calculated as 30 (the current access minus the last VA provides 32−2=30). As a consequence, there is no hit on the first table 500. This is because although the program counter hash value may match (all accesses are made in respect of different iterations of the same instruction), the current stride value does not (30 is different from 1). As a consequence, the second table 510 is updated with information corresponding to the discontinuous access request at UID 3. The columns of the second table 510 correspond with a subset of those described for the first table 500. In particular, the new entry is added as being at program counter hash value 0xcc, the mode is 'init', the last address to be accessed in these circumstances is 32, no stride has yet been determined (stride is 0) and so also the confidence is 0. Again, based on the first table 500, prefetching occurs. This is because although the stride appears to have changed, the confidence value remains sufficiently high that prefetching can occur. Consequently, prefetching occurs at address 32+(1×4)=36. Note also that the confidence of the entry of the first table 500 is decremented to represent the fact that a miss occurred.

FIG. 5F shows a subsequent access occurring at UID 4. Again, a hit occurs on the entry of the first table, causing the confidence value to be incremented by one back to 7. Furthermore, the last VA and last UID are updated to correspond with the values for this iteration (33 and 4 respectively). Again, a prefetch occurs based on this entry of the first table 500, so that the prefetch address is 37.

FIG. 5G illustrates a further access that occurs, which hits the first table 500. Again, the last VA, last UID are both updated in the first table 500 (to 34 and 5 respectively) and a prefetch occurs at an address 38.

FIG. 5H illustrates a second miss (e.g. the entry for the current instruction has a stored stride value that differs from the calculated stride value). In this case, the address 64 has a stride of 30, which differs from the current stride value of 1 shown in the first table 500 for this program counter hash value. Accordingly, this access is handled by the second stride calculation circuitry that uses the second table 510. Here, a hit occurs on the stride value stored for the program counter value and so the mode of the entry is changed from 'init' to 'set up'. Similarly, the last VA is changed to 64, which is the address being accessed by the UID 6. It will be noted that since this entry of the second table 510 is not yet fully established (e.g. in 'stride' mode), prefetching continues to occur on the basis of the entry of the first table 500.

FIG. 5I shows a further hit on the first table, as has previously been described.

FIG. 5J illustrates a yet further hit on the entry of the first table 500 as previously described.

FIG. 5K illustrates a third miss on the entry of the first table 500 as a consequence of access UID 9. Once again, this access is handled using the information in the second table 510. A hit occurs in respect of the second table 510, and so the entry is promoted from 'setup' to 'stride'. As previously described, the confidence is set to the default value (7) and the last VA and current stride values are set at 96 and 32 respectively, which are the corresponding values for UID 9. The prefetching that occurs now changes. In particular, the presence of a valid entry in the second table 510 (e.g., an entry in 'stride closing quote mode) for the current program counter value causes the entry in the first table 500 to be overridden. Prefetching therefore now occurs at an address 96+(4×32), which equals 224. The value of 32 is the current stride value that is stored in the entry for the second table 510. Meanwhile, the value 96 is the address that has been accessed and the multiplier of 4 corresponds with the same prefetch multiple that has been used up until this point.

FIG. 5L illustrates a further access at UID 10. Since a hit occurs in respect of the first table 500, the first table 500 is updated (thereby incrementing the confidence from 6 back to 7). However, prefetching continues to occur on the basis of the entry in the second table 510. This is because, as previously described, the second table 510 has a relevant entry for the current program counter value. This therefore overrides any entry in the first table 550 with an entry for the current program counter value. The entry of the second table 510 is therefore used for prefetching, which causes a prefetch to occur for address 225=97+(4×32).

FIG. 5M shows a similar example in which the first table 500 is updated, but the second table 510 is used to inform the prefetching process, which is illustrated in table 530. In FIG. 5M, a miss occurs in respect of the entry of the first table 500. This causes the confidence of the entry of the first table 500 to be decreased as previously described. However, the entry in the second table 510 still hits. Consequently, the confidence of the entry in the second table 510 is not decremented. Furthermore, prefetching continues to occur on the basis of the entry in the second table 510 as illustrated in table 530.

It will be noted that each time a miss occurs in this example (e.g. where there is an entry having a relevant program counter hash value, but an incorrect stride value), the miss is referred to as a MissWindow. This is because for the second stride calculation circuitry 170 to be engaged, it is necessary not only for the miss to occur, but for the miss to occur by a particular margin. This margin, referred to as the MissWindow, helps to avoid a situation in which the calculated stride is determined to be incorrect purely as a consequence of out-of-order execution occurring. For instance, if a series of iterations of the instruction causes a series of accesses to addresses 1, 2, 3, 4, 5, then encountering these instructions out of order (e.g. 1, 2, 3, 5, 4) could call into question the calculated stride value. The MissWindow therefore requires that in order for the access to be considered for the second table 510, the miss must occur as a consequence of the calculated stride being significantly different from the stride stored in the first table 500. For instance, the MissWindow may be defined as (–2× entry_stride<=calculated_stride<=8×entry_stride). Thus, for a particular entry of the first table 500 having the relevant program counter value having an entry_stride, a miss occurs for a calculated stride (causing it to be considered by the second table 510) if that calculated stride is less than –2 time or more than 8 times the entry_stride. Note that the MissWindow is significant only for determining whether the accesses to be considered by the second table 510. It has no bearing on any modification of the conference value stored for the corresponding entry of the first table 500.

Figure 6:
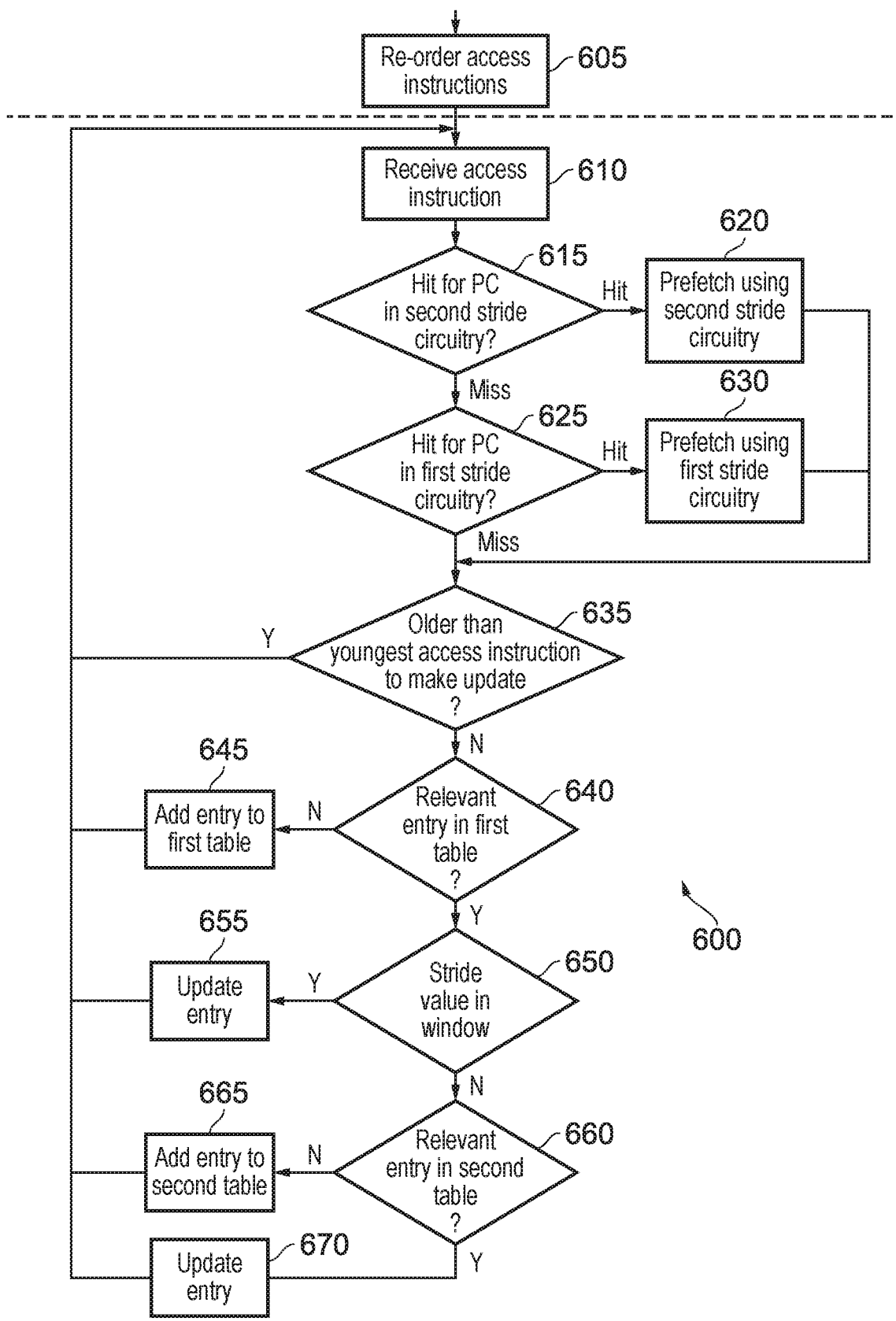
FIG. 6 illustrates a flowchart that shows a process for handling access instructions with regards to updating the tables and causing prefetching to occur.

FIG. 6 illustrates a flowchart 600 that shows a process for handling access instructions with regards to updating the tables and causing prefetching to occur. At step 605, reordering of access instructions occurs. Note that, in practice, this reordering of the access instructions may take place on an ongoing basis as access instructions are added and removed and generally would be performed at a re-order buffer elsewhere in the pipeline. Its presence here in the flowchart 600 is, therefore, for illustrative purposes only. The remaining steps are performed, for instance, by training circuitry 140. At step 610, an access instruction is received by, for instance, load/store circuitry 120. At step 615, it is determined whether the program counter hash value of the instruction hits on the second table 510, at the second stride calculation circuitry 170 (e.g. whether there is an entry in 'Stride' mode). If so, there is a valid entry in the second table 510, and this overrides any entry in the first table 500. Accordingly, at step 620, a prefetch occurs using the entry in the second table 510. The process then proceeds to step 635. If a hit does not occur at step 615, then at step 625, it is determined whether it occurs in respect of the first table 500. If so, then a prefetch occurs using that entry of the first table 500 at step 630 and the process proceeds to step 635. The process also proceeds to step 635 if there is also no hit in the first stride circuitry at step 625. At step 635, the UID of the current access request is compared to a tracked UID of the youngest instruction to update the first table 500. This is stored as, for instance, the "Last UID" entry in the first table 500 in FIG. 5. If the entry is older, then updates to the table 500 have already been made on newer entries, and so no further update is to occur. Consequently, the process returns to step 610 without further update to tables 500, 510. Otherwise, at a step 640, it is determined whether there is a relevant entry in the first table 500 (e.g. used by the first stride calculation circuitry 160). That is, whether there is an entry having a matching program counter value (hash). If not, then a new entry is added to the first table 500 (e.g. in 'init' mode) and the process returns to step 610. Otherwise, at step 650, it is determined whether the calculated stride value is within the MissWindow. If so, then the entry of the first table 500 is updated as appropriate at step 655. That is, if a full hit occurs (the calculated stride is the same as the stride entry) then the mode increments and the confidence increases (if it is not already saturated). If the entry merely falls within the window, the confidence for the entry decreases. In any event, having updated the entry at step 655, the process returns to step 610. Otherwise, if the stride is not within the MissWindow, then at step 660, it is determined whether there is a relevant entry in the second table 510. That is, whether there is an entry having a matching program counter value (hash). If not, then a new entry (e.g. in 'init' mode) is added to the second table 510 and the process returns to step 610. Otherwise, the entry is updated at step 670 (e.g. the confidence is incremented or decremented and the mode changed depending on whether the calculated stride matches the stride entry).

Figure 7:
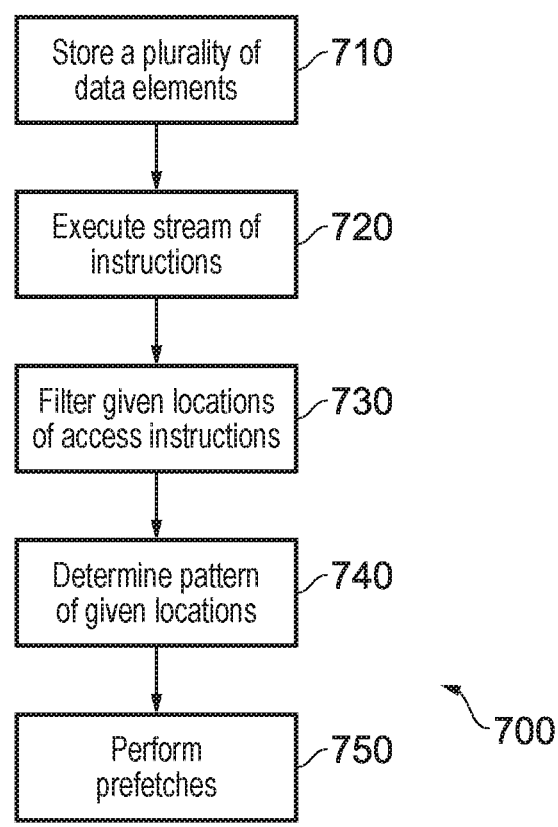
FIG. 7 illustrates a flowchart that shows a process of data processing in accordance with some embodiments.

FIG. 7 illustrates a flowchart 700 that shows a process of data processing in accordance with some embodiments. At step 710, a plurality of data elements are stored in, for instance, storage circuitry 110. At step 720, a stream of instructions is executed. These may be issued by, for instance, processing circuitry 132 and/or a load/store circuitry 120 that executes access instructions. At step 730, given locations of the access instructions are filtered by the filter circuitry 180. This filtering is such that discontinuous access instructions are considered by stride circuitry 170. Other access instructions may be considered by other stride calculation circuitry 160, or may be disregarded. At step 740, a pattern is determined using the filtered locations. At step 750, prefetching is performed based on explicit access requests that are made in combination with the determined pattern that was determined at step 740. Accordingly, the prefetching occurs using the discontinuous accesses.

As a consequence of the above, it is possible to calculate cumulative stride lengths and to use the calculated cumulative stride lengths in order to perform prefetching. This process does not involve 'trial and error' or tracking large numbers of potential stride lengths, which may consume very large amounts of storage. Instead, the cumulative stride length can be quickly and accurately calculated.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
processing circuitry to execute a stream of instructions comprising access instructions that access at least some data elements at given locations of a storage circuitry;
training circuitry to determine a pattern of the given locations based on the access instructions;
prefetch circuitry to perform prefetches based on the pattern, wherein
the training circuitry comprises first stride calculation circuitry to calculate first stride lengths of the access instructions and to store the first stride lengths in a first stride length storage table in association with the access instructions, wherein discontinuous access instructions are identified as those of the access instructions where the first stride lengths calculated by the first stride calculation circuitry differ from what is stored for those access instructions in the first stride length storage table;
the training circuitry comprises second stride calculation circuitry to calculate a second stride length based on the discontinuous access instructions that have been identified;
the pattern is based on the second stride length; and
in response to the first stride length calculated by the first stride calculation circuitry for a given access instruction differing from what is stored for the given access instruction in the first stride length storage table, the second stride calculation circuitry is adapted to be updated.

2. The apparatus according to claim 1, wherein the data elements are stored within a plurality of independent data structures.

3. The apparatus according to claim 2, wherein the plurality of independent data structures are evenly spaced in the storage circuitry.

4. The apparatus according to claim 2, wherein the plurality of independent data structures are arrays.

5. The apparatus according to claim 2, wherein the access instructions are adapted to access the data elements in an order that iterates between each of the plurality of independent data structures.

6. The apparatus according to claim 1, wherein the training circuitry comprises stride calculation circuitry to calculate a stride length based on the access instructions; and
the prefetch circuitry is adapted, in response to one of the data elements being explicitly requested from an address of the storage circuitry, to fetch another one of the data elements at a corresponding address, which is formed by adding the address to a multiple of the stride length.

7. The apparatus according to claim 1, wherein the data elements are stored within a plurality of independent data structures; and
the discontinuous access instructions are adapted to access at least some boundaries of the plurality of independent data structures.

8. The apparatus according to claim 7, wherein the discontinuous access instructions are adapted to access first elements of the plurality of independent data structures.

9. The apparatus according to claim 1, wherein the second stride length is equal to an accumulation of each stride length between each of the access instructions from a first discontinuous access instruction to a next discontinuous access instruction.

10. The apparatus according to claim 1, wherein the access instructions are issued to the processing circuitry out of order as compared to a program order;
a first stride window is at least partly defined by the first stride length; and
the miss falls outside the first stride window.

11. The apparatus according to claim 1, wherein the access instructions are issued to the processing circuitry out of order as compared to a program order;
the training circuitry is adapted to track a youngest access instruction to have updated the training circuitry; and the training circuitry is adapted to disregard an older access instruction, which is older than the youngest access instruction.

12. The apparatus according to claim 1, wherein the access instructions are stored at a same program counter value.

13. The apparatus according to claim 1, wherein given locations accessed by the discontinuous instructions create a discontinuous stride.

14. A data processing method comprising:
executing a stream of instructions comprising access instructions that access at least some stored data elements at given locations;
determining a pattern of the given locations based on the access instructions;
performing prefetches based on the pattern, wherein
the determining the pattern includes calculating first stride lengths for the access instructions and storing the first stride lengths in a first stride length storage table in association with the access instructions, wherein discontinuous access instructions are identified as those of the access instructions where the first stride lengths calculated by the first stride calculation circuitry differs from what is stored for those access instructions in the first stride length storage table, the determining the pattern includes calculating a second stride length based on the discontinuous access instructions that have been identified, wherein the pattern is based on the second stride length, and in response to the first stride length calculated for a given access instruction differing from what is stored for the given access instruction in the first stride length storage table, the second stride length is updated.

* * * * *